United States Patent [19]

Hoffman

[11] 4,270,387
[45] Jun. 2, 1981

[54] DRIFT COMPENSATED GYROSCOPE
[75] Inventor: Jay Hoffman, Livingston, N.J.
[73] Assignee: The Singer Company, Little Falls, N.J.
[21] Appl. No.: 34,109
[22] Filed: Apr. 30, 1979
[51] Int. Cl.³ .................. G01C 19/14; G01C 19/42
[52] U.S. Cl. .................. 73/504; 73/516 LM; 74/5 R
[58] Field of Search .......... 73/504, 505, 516 R, 73/516 LM, 517 R; 74/5 R, 5.22, 5.4

[56] References Cited
U.S. PATENT DOCUMENTS 3,359,805 12/1967 Schlitt .................. 74/5 R X
3,368,411 2/1968 Sann .................... 74/5.4

Primary Examiner—James J. Gill
Attorney, Agent, or Firm—John C. Altmiller; Thomas W. Kennedy

[57] ABSTRACT

A gyroscope which has a spinning fluid filled annulus as an inertial angle rate sensor is compensated for inertial drift by resolving an output signal from the sensor into acceleration proportional components related to the gimbal axes and the component related to the inner axis is applied to the outer axis, and the component related to the outer axis is applied to the inner axis to cancel out the effects of drift.

4 Claims, 4 Drawing Figures

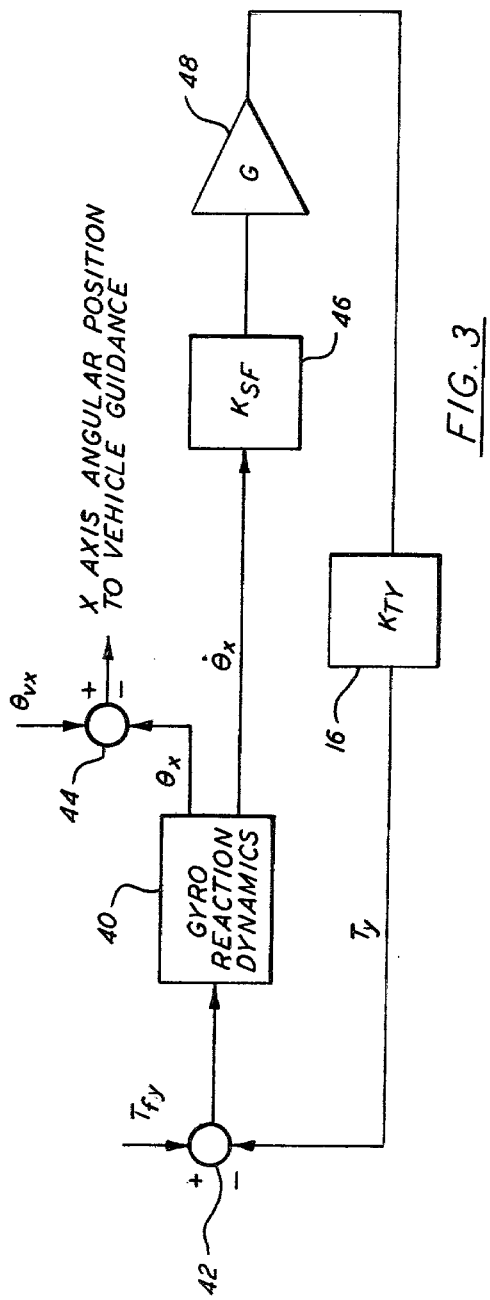
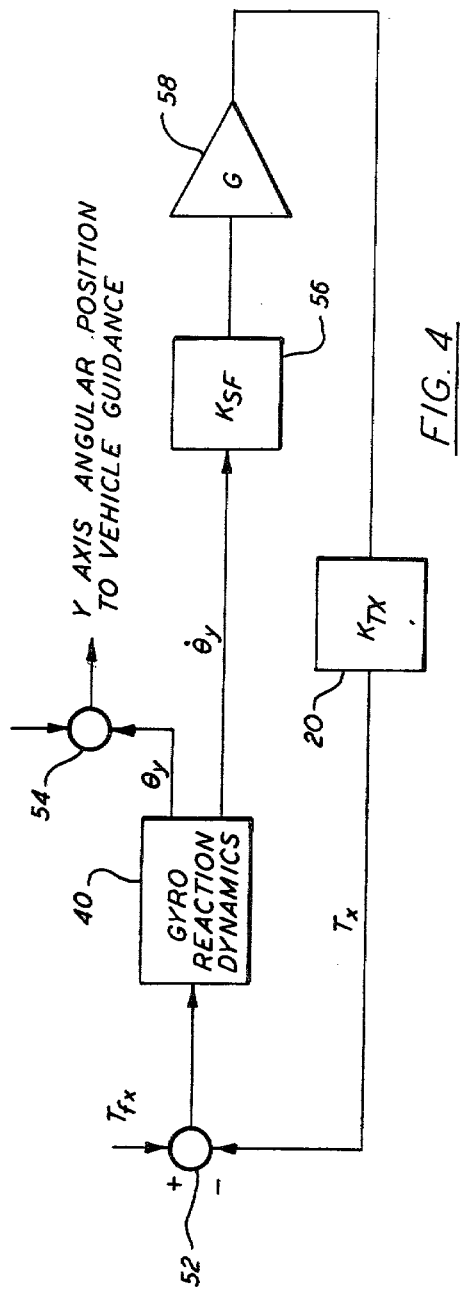
FIG. 3
FIG. 4

DRIFT COMPENSATED GYROSCOPE

BACKGROUND OF THE INVENTION (1) Field of the Invention

This invention relates to new and improved gyroscopes. More particularly, the invention relates to a method and apparatus for compensating two-axis gyroscopes for inertial drift.

(2) Description of the Prior Art

A gyroscope is, generally, a flywheel or other rotating body which can be rotated at a high angular velocity and which is mounted in two gimbal sets in order to take advantage of the tendency of the rotating body to remain in a fixed position relative to inertial space. By means of suitable measuring devices connected between the gimbals and between the outer gimbal and a vehicle carrying the gyroscope, the position of the gyroscope may conveniently be related to X and Y axes with respect to the vehicle itself. The measuring devices may be dials or angle transducers which transmit the angles measured to remote indicators.

If gyroscopes were perfect, that is, if there were no friction in the gimbal bearings and, if there were no extraneous sources of torque, such as imbalance, etc., the inertial rate that the flywheel would experience would be zero and true angular measurements would be obtained. Even though the vehicle were moving around the gyroscope, the inner flywheel would be totally undisturbed. In actuality, imperfections inherent to some degree in every gyro cause drift of the gyroscope to occur. This is caused by the application of a torque tending to change the direction of the spindle axis. Gyroscope users have learned to live with the drifts produced by such imperfections and to correct them either by hand, periodically, or by using very sophisticated terrestrial kinetic measurements and autobiasing techniques which involve measuring and comparing and slaving the device to the earth. In other words, the rate of drift is determined and compared to the known rate at a given latitude, and a correction is made.

SUMMARY OF THE INVENTION

The problem of gyroscope drift outlined above is solved in the present invention by using a kinetic inertial sensor of the type described in U.S. Pat. Nos. 3,618,399; 3,910,122; 3,910,123, and 3,960,691, as well as in co-pending U.S. patent application Ser. No. 34,110 filed Apr. 30, 1979, and entitled "KINEMATIC INERTIAL SENSOR", as the inertial element in a gyroscope. Sensors of this type generate an output signal proportional to angular rate input as the result of movement of a fluid in an annulus. In the present invention, such a sensor is mounted in gimbal sets and serves as the inertial element of a gyroscope; the angular rate proportional output signal resulting from an angular rate input applied to the sensor in the plane of the double set of gimbal axes is used to correct the gyroscope drift. For this purpose, a torquer connected between the gimbal sets carrying the sensor and a torquer connected between the outer gimbal set and the frame are provided with voltages proportional to the error, as referred to their respective axes, to drive the suspension in a direction opposite to that induced by the error torques. To this end, the angular velocity proportional output is resolved into X and Y components and a voltage proportional to the X component is applied to the Y-axis torquer and a voltage proportional to the Y component is applied to the X-axis torquer to compensate for and null out the drift. Under these conditions the gyroscope provides a cleansed output signal and drift compensation is quickly, easily and inexpensively obtained.

BRIEF DESCRIPTION OF THE DRAWINGS

FIGS. 3 and 4 are schematic diagrams of the analysis of the drift compensated gyroscope.

DETAILED DESCRIPTION OF THE INVENTION

Figure 1:
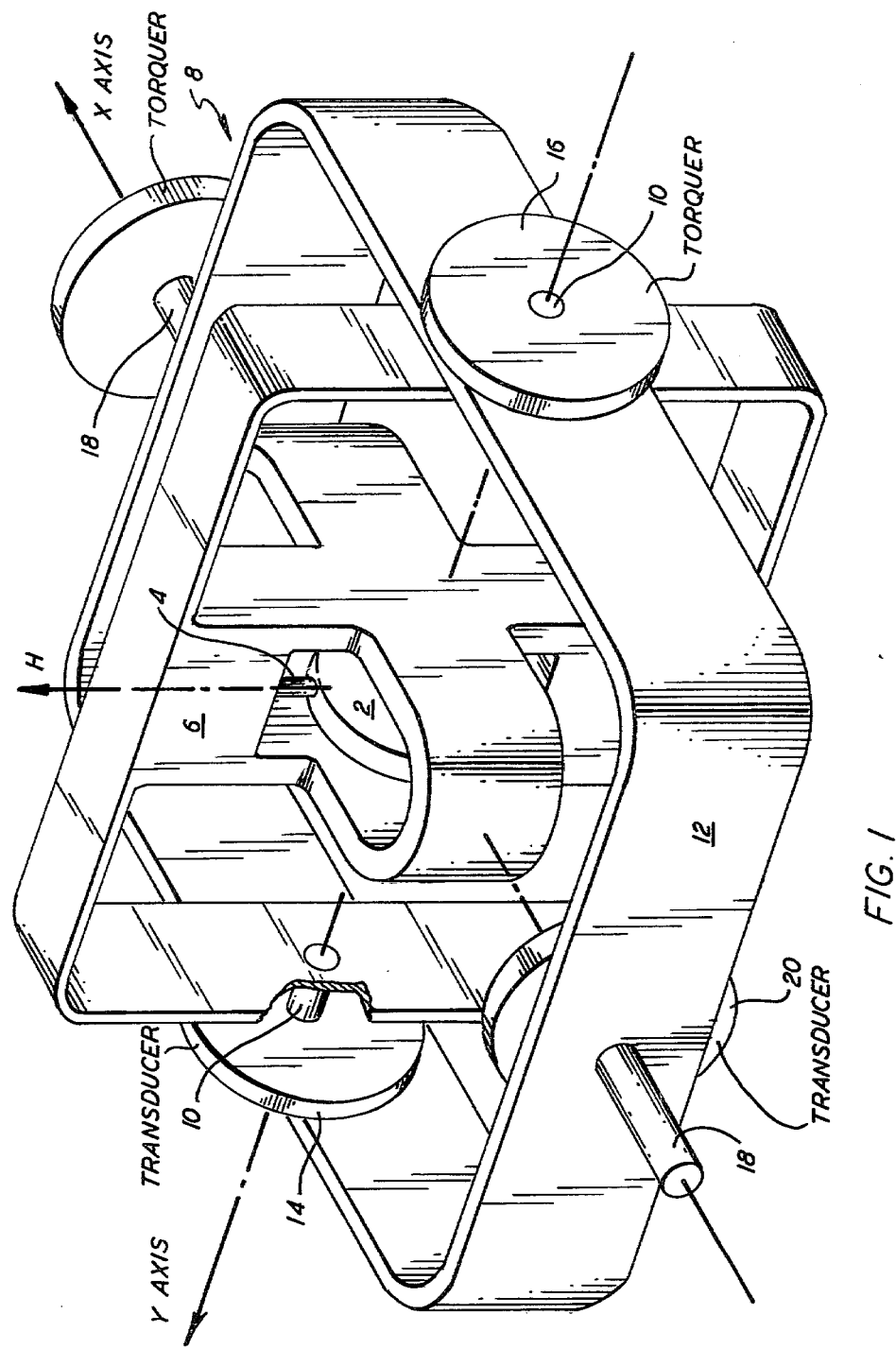
FIG. 1 is a view in elevation of a drift compensated gyroscope according to the teachings of the invention.

Reference is made to FIG. 1 in which the rotating element 2 of the gyroscope 8 is mounted on spindle 4 carried in gimbal 6. Inertial sensor 2 is rotated about the sensitive axis formed by spindle 4 at a given angular rate and with an angular momentum H designated by the arrow extension of the axis formed by the spindle 4. Inertial sensor 2 contains an annulus filled with a conducting fluid lying in the plane containing spindle 4. Movement of the fluid through the field of a magnet (not shown) forming part of sensor 2 causes eddy currents to be generated which are processed to provide a signal proportional to the angular velocity being experienced by the sensor. A suitable means of propulsion (not shown), such as an electric motor or an air driven turbine, is used to drive inertial sensor 2 at the desired spindle rate, as will be understood by those skilled in the art.

Inner gimbal 6 is supported, in turn, on spindle 10 which is so positioned in the frame of the gimbal that the Y-axis formed by spindle 10 is perpendicular to the spindle axis of inertial sensor 2. Operatively connected between inner gimbal 6 and outer gimbal 12 are Y-axis gimbal transducer 14 and Y-axis torquer 16. Gimbal 12, in turn, is mounted on spindle 18 which from the X-axis perpendicular to both the Y-axis and the spindle axis of inertial sensor 2. Spindle 18 is provided with X-axis gimbal angle transducer 20 and X-axis torquer 22 which, as will be understood by those skilled in the art, are operatively connected between outer gimbal 12 and a support, not shown, for mounting the gyroscope on a vehicle. Gimbal angle transducers 14 and 20, torquers 16 and 22, and inertial sensor 2 are shown as simple blocks; electrical connections for transmitting power and signals, as appropriate, to and from fluid contacting electrodes (not shown) in inertial sensor 2, transducers 14 and 20, and torquers 16 and 22 are omitted from the drawing, since well known arrangements may be employed for these purposes.

Figure 2:
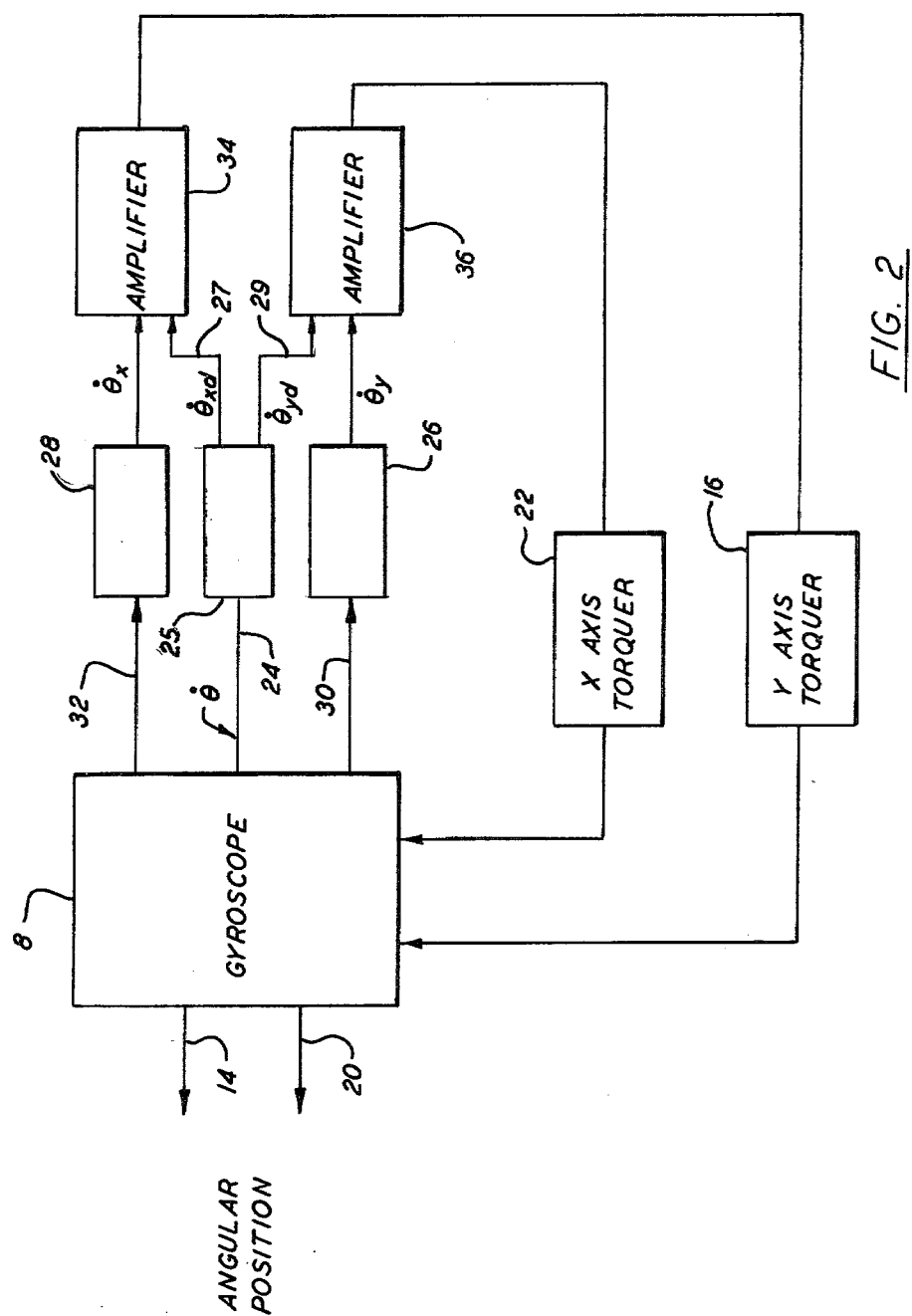
FIG. 2 is a block diagram of the circuitry employed in the gyroscope of FIG. 1.

The block diagram of FIG. 2 illustrates the way in which an angular rate proportional signal, transmitted by connecting line 24 to demodulator 25 from drift compensated gyroscope 8, is used to generate drift correction signals for application to torquers 16 and 22 on the X- and Y- axes of the gyroscopes. In addition to the angular drift rate proportional signals $\dot{\theta}_{xd}$ and $\dot{\theta}_{yd}$, signals are also generated, in a manner well known to those skilled in the art, which are related to the X- and Y- axes for describing the terrestrial rate of the inertial sensor at any given instant. These signals, emanating from the conventional gyroscope pick-offs, are supplied to demodulators 26 and 28 by connecting lines 30 and 32. Demodulators 26 and 28 convert the carrier borne, angular rate proportional, voltage output from sensor 2 into DC components proportional to $\dot{\theta}_x$ and $\dot{\theta}_y$ representing the angular rate proportional voltages on the X and the Y axis, respectively. These signals are added to the drift rate proportional signals $\dot{\theta}_{xd}$ and $\dot{\theta}_{yd}$ at the inputs to amplifiers 34 and 36 and are applied to X- and Y- axes torquers 22 and 16. Thus, a signal proportional to the sum of drift and terrestrial rate on the X-axis is applied through Y-axis torquer 16 to gyroscope 8, and a signal proportional to the sum of drift and terrestrial rate on the Y-axis is applied through X-axis torquer 22 to gyroscope 8. The compatability of signal scaling to permit direct summing, as shown, is accomplished by judicious gain adjustments effected at the outputs of demodulator 25, as will be understood by those skilled in the art. The position indicating function performed by gimbal angle transducers 14 and 20 is symbolically shown in FIG. 2 by the arrows numbered 14 and 20 pointing outward from gyroscope 8.

An understanding of the operation of the embodiment of the invention illustrated in FIGS. 1 and 2 may be gained by reference to FIGS. 3 and 4 which are analytic representations of the mechanics and of the electrical circuits used for generating X- and Y- axis corrections in accordance with the teachings of the invention.

In FIG. 3, gyro reaction dynamics 40 are mechanically effected by the combining of Y-axis drift torque component $T_{fy}$ and any feedback torque $T_y$ acting upon the gyroscope, such as that necessary to compensate terrestrial rate. This is representationally shown as occurring in summing junction 42. Two outputs from gyroscope reaction dynamics 40 are shown, namely, the change in angular position $\theta_x$, which is fed to summing junction 44, and the rate proportional voltage $\dot{\theta}_x$, referred to the X-axis, which is fed to block 46. Summing junction 44 also receives as an input the vehicle angle $\theta_{vx}$, referred to the X-axis. $\theta_x$ and $\theta_{vx}$ are thus added mechanically and the output is a clean measurement of the angular position of the vehicle relative to the X-axis which is made available by transducer 20. The angular rate proportional signal $\dot{\theta}_x$ is supplied to amplifier 48 through block 46 with a scale factor $K_{SF}$ representing the effect of the sensor upon the signal. In amplifier 48 having gain G, the proportional signal $\dot{\theta}_x$ is amplified to provide sufficient amplitude and appropriate polarity for driving Y-axis gimbal torquer 16. Y-axis gimbal torquer 16 is shown as having a scale factor $K_{TY}$. As was just mentioned, the output of torquer 16, torque $T_y$, is mechanically coupled into the gyro reaction dynamics 40 by summing junction 42.

Similar functions are performed for Y-axis correction as shown in the circuit of FIG. 4. There the angular rate experienced by gyro reaction dynamics 40 as the result of the addition of X-axis drift torque $T_{fx}$ and feedback torque $T_x$, shown schematically at summing junction 52, results in angle and rate proportional signals $\theta_y$ and $\dot{\theta}_y$. Gimbal inertial angle $\theta_y$ is combined in summing junction 54 with the vehicle angle $\theta_{vy}$ to show the corrected Y-axis angular position on Y-axis angular transducer 14. The Y-axis related, rate proportional voltage $\dot{\theta}_y$, derived by demodulation as shown in FIG. 2 and having an amplitude resulting from the kinetic inertial sensor scale factor $K_{SF}$ shown in block 56, passes to amplifier 58 where it is transformed into a signal for driving X-axis gimbal transducer 20 to produce the necessary feedback torque $T_x$.

In operation, torques applied to the rotating annulus and its housing as a result of friction, imbalance, etc., in the gyroscope are sensed by the liquid in the annulus and the motion of the liquid is translated into a voltage proportional to the angular rate experienced by the annulus. This voltage is converted by synchronous demodulators in a manner known in the art into voltages referred to the gimbal axes of the double gimballed gyroscope. These voltages, which are therefore proportional to the angular rate being experienced by the disk, are separately amplified and applied through torquers to the gimbal axes, the Y-axis signal being applied to the X-axis torquer and the X-axis signal being applied to the Y-axis torquer. By appropriate choice of amplifier gain and polarity, the amplitude of the correcting torque applied on a given axis is continuously made equal and opposite to the friction torque being sensed on the axis. With the effect of drift thus compensated, the gyroscope does not drift; it retains the same position with respect to inertial space and therefore provides a measurement of angular position without further need of correction.

The embodiment of the invention described above is that of a conventional gyroscope in which a kinematic inertial sensor replaces the usual momentum element for providing an inherent capability for measuring error induced drift effects. In it, the inventive system is used in a terrestrially locked mode in which the conventional gyro pick-offs and torquers are slaved to move the inertial element and keep it fixed on the rotating earth. The system in this form is, therefore, particularly useful in long range navigation.

In short range problems, such as are encountered in the guidance of short range missiles, compensation for terrestrial rate may not be required, but feedback of the drift rate proportional signals, according to the teachings of the invention, can make possible the use of less expensive gyroscope suspensions.

What is claimed is:

1. A drift compensated gyroscope including:
   an inertial angle rate sensor comprising a fluid filled annulus mounted for rotation about an axis perpendicular to the axis of rotation of the sensor on the inner of a double set of gimbals and having an output signal proportional to the angular rate of the sensor, means for rotating the sensor about the axis of rotation of the sensor;
   means for resolving the output signal into components related to the gimbal axes and applying substantially equal and opposite rates proportional to the components to the gimbal axes to cancel out the effects of drift, and
   means for measuring the gimbal inertial angles.

2. The gyroscope of claim 1 in which an angular rate proportional to the angular rate drift component related to the inner gimbal axis is applied to the axis of the inner gimbal and an angular rate proportional to the angular rate drift component related to the outer gimbal axis is applied to the outer gimbal axis.

3. The gyroscope of claim 2 in which the annulus is liquid filled and has an output signal voltage which is resolved into acceleration proportional voltages related to the gimbal axes, and in which the acceleration proportional voltages are amplified and applied to torquers on the gimbal axes.

4. The method of correcting a doubly gimballed gyroscope for drift comprising:

(a) mounting a fluid filled annulus for rotation about an axis perpendicular to the axis of rotation to be sensed on the inner of a double set of gimbals;
(b) spinning said fluid containing annulus;
(c) generating a signal porportional to the drift induced angular rate experienced by the gyroscope with said fluid containing annulus;
(d) resolving the signal into components related to the gimbal axes; and
(e) applying torque proportional to each component to the opposite gimbal axis, by torquers, so as to produce a rate of the gyroscope which is equal and opposite to that induced by the drift.

* * * * *